US 7,356,188 B2

(12) United States Patent
Venkatesan et al.

(10) Patent No.: US 7,356,188 B2
(45) Date of Patent: Apr. 8, 2008

(54) RECOGNIZER OF TEXT-BASED WORK

(75) Inventors: Ramarathnam Venkatesan, Redmond, WA (US); Michael T. Malkin, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 561 days.

(21) Appl. No.: 09/843,255

(22) Filed: Apr. 24, 2001

(65) Prior Publication Data

US 2002/0172425 A1 Nov. 21, 2002

(51) Int. Cl.
*G06K 9/72* (2006.01)
*G06K 9/00* (2006.01)

(52) U.S. Cl. ........................ 382/229; 382/100
(58) Field of Classification Search ........... 382/176, 382/187, 209, 217, 218, 224, 229; 711/216, 711/164; 707/5, 6; 710/73; 713/176; 380/28
See application file for complete search history.

(56) References Cited

U.S. PATENT DOCUMENTS

| | | | |
|---|---|---|---|
| 4,773,039 A * | 9/1988 | Zamora | 715/540 |
| 5,093,869 A | 3/1992 | Alves et al. | |
| 5,210,820 A | 5/1993 | Kenyon | |
| 5,425,081 A | 6/1995 | Gordon et al. | |
| 5,465,353 A * | 11/1995 | Hull et al. | 707/5 |
| 5,535,020 A | 7/1996 | Ulichney | |
| 5,613,004 A | 3/1997 | Cooperman et al. | 380/28 |
| 5,664,016 A | 9/1997 | Preneel et al. | 380/28 |
| 5,687,236 A | 11/1997 | Moskowitz et al. | 380/28 |
| 5,689,639 A | 11/1997 | Schwarz | 710/73 |
| 5,734,432 A | 3/1998 | Netravali et al. | |
| 5,774,588 A * | 6/1998 | Li | 382/230 |
| 5,802,518 A * | 9/1998 | Karaev et al. | 707/9 |
| 5,809,498 A | 9/1998 | Lopresti et al. | 707/6 |

(Continued)

FOREIGN PATENT DOCUMENTS

JP 2000050057 2/2000

(Continued)

OTHER PUBLICATIONS

Lin et al., "A Robust Image Authentication Method Distinguishing JPEG Compression from Malicious Manipulation", IEEE Transactions, Feb. 2001, vol. 11, No. 2, pp. 153-168.

(Continued)

*Primary Examiner*—Vikkram Bali
(74) *Attorney, Agent, or Firm*—Lee & Hayes, PLLC

(57) ABSTRACT

Described herein is a technology for recognizing the content of text documents. The technology determines one or more hash values for the content of a text document. Alternatively, the technology may generate a "sifted text" version of a document. In one implementation described herein, document recognition is used to determine whether the content of one document is copied (i.e., plagiarized) from another document. This is done by comparing hash values of documents (or alternatively their sifted text). In another implementation described herein, document recognition is used to categorize the content of a document so that it may be grouped with other documents in the same category. This abstract itself is not intended to limit the scope of this patent. The scope of the present invention is pointed out in the appending claims.

23 Claims, 7 Drawing Sheets

U.S. PATENT DOCUMENTS

| | | | |
|---|---|---|---|
| 5,875,264 A * | 2/1999 | Carlstrom | 382/181 |
| 5,899,999 A | 5/1999 | De Bonet | |
| 5,915,038 A | 6/1999 | Abdel-Mottaleb et al. | |
| 5,918,223 A | 6/1999 | Blum et al. | |
| 6,081,893 A * | 6/2000 | Grawrock et al. | 713/183 |
| 6,101,602 A | 8/2000 | Fridrich | 713/176 |
| 6,246,777 B1 | 6/2001 | Agarwal et al. | |
| 6,278,385 B1 | 8/2001 | Kondo et al. | |
| 6,363,381 B1 | 3/2002 | Lee et al. | |
| 6,363,463 B1 | 3/2002 | Mattison | 711/164 |
| 6,377,965 B1 | 4/2002 | Hachamovitch et al. | |
| 6,401,084 B1 | 6/2002 | Ortega et al. | |
| 6,418,430 B1 | 7/2002 | DeFazio et al. | |
| 6,477,276 B1 | 11/2002 | Inoue et al. | |
| 6,513,118 B1 | 1/2003 | Iwamura | |
| 6,522,767 B1 | 2/2003 | Moskowitz et al. | |
| 6,532,541 B1 | 3/2003 | Chang et al. | |
| 6,546,114 B1 | 4/2003 | Venkatesan et al. | |
| 6,574,348 B1 | 6/2003 | Venkatesan et al. | |
| 6,584,465 B1 | 6/2003 | Zhu et al. | |
| 6,625,295 B1 | 9/2003 | Wolfgang et al. | |
| 6,647,128 B1 | 11/2003 | Rhoads | |
| 6,658,423 B1 * | 12/2003 | Pugh et al. | 707/102 |
| 6,658,626 B1 | 12/2003 | Aiken | |
| 6,671,407 B1 | 12/2003 | Venkatesan et al. | |
| 6,674,861 B1 | 1/2004 | Xu et al. | |
| 6,687,416 B2 | 2/2004 | Wang | |
| 6,701,014 B1 | 3/2004 | Syeda-Mahmood | |
| 6,751,343 B1 | 6/2004 | Ferrell et al. | |
| 6,754,675 B2 | 6/2004 | Abdel-Mottaleb et al. | |
| 6,768,809 B2 | 7/2004 | Rhoads et al. | |
| 6,768,980 B1 | 7/2004 | Meyer et al. | |
| 6,771,268 B1 | 8/2004 | Crinon | |
| 6,782,361 B1 | 8/2004 | El-Maleh et al. | |
| 6,799,158 B2 | 9/2004 | Fischer et al. | |
| 6,839,673 B1 | 1/2005 | Choi et al. | |
| 6,971,013 B2 | 11/2005 | Mihcak et al. | |
| 6,973,574 B2 | 12/2005 | Mihcak et al. | |
| 6,990,444 B2 | 1/2006 | Hind et al. | |
| 6,990,453 B2 | 1/2006 | Wang et al. | |
| 6,996,273 B2 | 2/2006 | Mihcak et al. | |
| 7,095,873 B2 | 8/2006 | Venkatesan et al. | |
| 2002/0126872 A1 | 9/2002 | Brunk et al. | |
| 2002/0196976 A1 | 12/2002 | Mihcak et al. | |
| 2003/0056101 A1 | 3/2003 | Epstein | |
| 2003/0118208 A1 | 6/2003 | Epstein | |
| 2003/0169269 A1 | 9/2003 | Sasaki et al. | |
| 2005/0065974 A1 | 3/2005 | Mihcak et al. | |
| 2005/0071377 A1 | 3/2005 | Mihcak et al. | |
| 2005/0076229 A1 | 4/2005 | Mihcak et al. | |
| 2005/0084103 A1 | 4/2005 | Mihcak et al. | |
| 2005/0165690 A1 | 7/2005 | Liu et al. | |
| 2005/0180500 A1 | 8/2005 | Chiang et al. | |

FOREIGN PATENT DOCUMENTS

| | | |
|---|---|---|
| JP | 2000149004 | 5/2000 |
| JP | 2000261655 | 9/2000 |
| JP | 2000332988 | 11/2000 |
| JP | 2000350007 | 12/2000 |
| WO | WO 99/17537 | 4/1999 |

OTHER PUBLICATIONS

Schneider et al., "A Robust Content Based Digital Signature for Image Authentication", Proceedings, International Conference, Sep. 1996, vol. 3, pp. 227-230.

B. Chen and G. W. Wornell, "Digital watermarking and information embedding using dither modulation," Proc. IEEE Workshop on Multimedia Signal Processing, Redondo Beach, CA, pp. 273-278, Dec. 1998.

F. A. P. Petitcolas and R. J. Anderson. "Evaluation of copyright marking systems," Proceedings of IEEE Multimedia Systems'99, vol. 1, pp. 574-579, Jun. 7-11, 1999, Florence, Italy.

I. J. Cox, J. Killian, T. Leighton, and T. Shamoon, "A secure robust watermark for multimedia," Information Hiding Workshop, University of Cambridge, pp. 185-206, 1996.

J. Dittman, M. Stabenau and R. Steinmetz, "Robust MPEG video watermarking technologies," Proceedings of ACM Multimedia '98, The 6th ACM International Multimedia Conference, Bristol, England, pp. 71-80.

M. D. Swanson, B. Zhu and B. Chau, "Object based transparent video watermarking," Proceedings of IEEE Signal Processing Society 1997 Workshop on Multimedia Signal Processing, Jun. 23-25, 1997, Princeton, New Jersey, USA.

M. K. Mihçak and R. Venkatesan, "A tool for robust audio information hiding: A perceptual audio hashing algorithm," submitted to Workshop on Information Hiding, Pittsburgh, PA, 2001.

T. Kalker and J. Haitsma, "Efficient detection of a spatial spread-spectrum watermark in MPEG video streams," Proc. IEEE ICIP, Vancouver, Canada, Sep. 2000.

Politis et al., "An Audio Signatures Indexing Scheme for Dynamic Content Multimedia Databases", Electrotechnical Conference, 2000. IEEE, vol. 2, May 29, 2000, pp. 725-728.

Chang et al., "A Spatial Match Representation Scheme for Indexing and Querying in Iconic Image Databases", 1997, ACM, Retrieved from the Internet http://protal.acm.org/citation.cfm?id=266890 &coll=ACM&dl=ACM&CFID=68519948 &CFTOKEN=85922645.

El-Kwae et al., "Efficient Content-Based Indexing of Large Image Databases", Apr. 2000, ACM, Retrieved from the Internet: http://portal.acm.org/citation.cfm?id=348762&coll=ACM&dl=ACM &CFID=68519948&CFTOKEN=85922645.

Lambrou et al, "Classification of Audio Signals Using Statistical Features on Time and Wavelet Transform Domains", Accoustics, Speech and Signal Processing, 1998. Proceedings of the 1998 IEEE International Conference on Seattle, WA, USA May 12-15, 1998, New York, NY, USA, IEEE, US, vol. 6, pp. 3621-3624.

Moreno et al., "Using the Fisher Kernal Method for Web Audio Classification", Acoustics, Speech, and Signal Processing, 2000. ICASSP '00. Proceedings. 2000 IEEE International Conference on Jun. 5-9, 2000, Piscataway, NJ, USA, IEEE, vol. 6, pp. 2417-2420.

Pye, D., "Content-Based Methods for the Management of Digital Music", Acoustics, Speech, and Signal Processing, 2000. ICASSP '00. Proceedings. 2000 IEEE International Conference on Jun. 5-9, 2000, Piscataway, NJ, USA, IEEE, vol. 6, pp. 2437-2440.

Cheng et al. "Aircraft identification based on the algebraic method" Hybrid Image and Signal Processing III, vol. 1702, Apr. 23, 1992, pp. 298-305.

Kozat, S. S. et al., "Robust Preceptual Image Hashing Via Matrix Invariants" Image Processing, Oct. 24, 2004.

Venkatesan, et al., "Image Hashing", Microsoft Research, Mar. 24, 2000, pp. 1-8.

Malvar, H.; "A Modulated Complex Lapped Transform And Its Applications to Audio Processing"; IEEE ICASSP '99, Phoenix Arizona, Mar. 1999, pp. 1-4.

R. Venkatesan, et al.; "Robust Image Hashing," Cryptography Group, Microsoft Research, 3 pages, Sep. 10, 2000.

Chang, et al; "RIME: A Replicated Image Detector for the World-Wide Web"; vol. 3527, Nov. 2-4, 1998, pp. 58-67.

* cited by examiner

RECOGNIZER OF TEXT-BASED WORK

TECHNICAL FIELD

This invention relates to a technology for recognizing a text-based work.

BACKGROUND

Detecting and determining the existence of text plagiarism is complex and difficult. This complexity and difficulty increases in direct proportion with the amount of available text documents. This is the age of electronic commerce, with so-called "e-books", Internet, HTML, e-mails, cube-classrooms and textbooks, electronic publishing, electronic fixing, scanning, Portable Document Format (idf) documents, Web pages, newspapers on-line, optical character recognition (OR), "cut-and-paste", and pay-per-chapter electronic publishing, etc. Becoming common place. In this age, text, copies of text, copies of copies of text, etc. Fly across the world in a matter of seconds.

In this age, it is thoughtlessly commonplace to electronically copy text and do so instantaneously with a click of a button. It is exceedingly easy to duplicate wholesale (or significant) portions of text documents. This task requires no more technical expertise than the ability to press a button or press CTRL-V (to complete the "cut-and-paste" operation).

Plagiarism

However, just because it is easy to do something, does not make it right. Although it is easy for a person to copy an author's work and pawn it off as his own, it does not make such action right. Such action is commonly called "cheating" or "plagiarism." Thus, a person engaging in such action is a "cheater" or a "plagiarize." Since most contemporary works are copyrighted (either automatically or upon registration), a plagiarize is also infringing such copyrights and is subject to civil and possibly criminal penalties.

Why would a plagiarize take action that is socially unacceptable, deceitful, and likely illegal? It is easy for the plagiarize to do and it is unlikely for him to be caught.

A plagiarize realizes that authorities must compare the pilfered words in his work with oceans of words, phrases, quotes, chapters, books, and other works. These oceans are vast and deep. The oceans include text found in all of the libraries, bookstores, web sites, manuals, textbooks, e-mails, etc. Of the whole world.

Catching a plagiarize is a daunting task indeed. Typically, if an investigative authority does not have a lead for a place to look, it is nearly impossible. However, one tool that makes the investigation easier is an electronic database (or index) of text that has been recorded electronically.

To avoid capture, a plagiarize may simply change a few token words, punctuations, pagination, text order, insertion of new text, and/or format in the text documents. Meanwhile, the true authors and publishers of the substantive content of the plagiarized work are robbed of well-deserved credit and/or royalties.

Conventional Efforts to Detect Plagiarism

Much effort has been directed towards protecting images, audio, and video by either embedding a hidden watermark and/or generating a mathematical representation of such content. Much of this effort is geared towards detecting identifiers within the content even after the signals have been modified (intentionally or purposefully). Such identifiers may be inserted into the content or be inherent in the content.

Generally, these conventional techniques may insert an imperceptible change in multimedia (such as audio or video). Alternatively, these techniques determine an inherent characteristic of a work. These conventional techniques rely on the foundation that the code/inherent characteristic cannot be detected without access to secret knowledge (such as a cryptographic key) and is unalterable without noticeably altering the content.

However, these conventional techniques have not been directed toward protecting text because they do not apply to text. They don't apply to text because these conventional techniques generally require a perceptual change to the original content or they are easily thwarted.

For example, the concept of embedding a watermark into an image or audio signal does not apply to text because embedding a watermark would significantly alter the content—unless, of course, the author inserts it. That alteration would be clearly perceivably noticeable. A mathematical representation of text is easily thwarted by changing a few token words, punctuations, insertion of new text, pagination, text order, and/or format in the text documents Side-by-side Text Comparison Approach. A side-by-side comparison of suspect text and possibly original text is an existing technique for detecting a copy of an original text. However, it can be easily thwarted by reordering text, adding text, and changing unessential text. If a comparison is done manually, a person may overlook such obfuscation tactics and see through to the similarity (which may amount to plagiarism). However, a comparison of electronic documents by a computer is not so forgiving.

With the emergence of so-called e-books, the problem of protecting text is becoming more important. E-books refer to the electronic distribution of electronic text. It is an alternative commercial publication technique.

Although such e-book mechanisms include cryptographic locks, such locks can be picked. Although no conventional technique is available, it would be helpful to determine if a subject body of text is substantially similar to an original text.

Content Categorization

Like plagiarism, categorizing the content of a text-based work often requires a subjective comparison of existing works. Works of similar nature are grouped into the same category. Text-based works may be classified into any number of categories, such as mystery novels, math textbooks, non-fiction books, self-help books, commercial web pages, poetry, and the other such works.

Typically, such categorization is subjectively determined by manual (i.e., human) subjective analysis of a work so that it may be grouped with an existing category. No such technique exists for automatically (i.e., without substantial human involvement) analyzing and categorizing a text-based work.

SUMMARY

Described herein is a technology for recognizing the content of text documents. The technology may detect similarity between text-based works in an automatic and accurate manner. Furthermore, it may categorize content of text-based works in an automatic and accurate manner.

Generally, the technology determines one or more hash values for the content of a text document. Furthermore, the technology may generate a "sifted text" version of a document.

In one implementation described herein, document recognition is used to determine whether the content of one document is copied (i.e., plagiarized) from another document. This is done by comparing hash values of documents (or alternatively their sifted text).

In another implementation described herein, document recognition is used to categorize the content of a document so that it may be grouped with other documents in the same category.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

The following description sets forth specific embodiments of the recognizer of text-based work that incorporate elements recited in the appended claims. These embodiments are described with specificity in order to meet statutory written description, enablement, and best-mode requirements. However, the description itself is not intended to limit the scope of this patent. Rather, the inventors have contemplated that the claimed present invention might also be embodied in other ways, in conjunction with other present or future technologies.

Incorporation by Reference

The following co-pending patent applications are incorporated by reference herein (which are all assigned to the Microsoft Corporation):

U.S. patent application Ser. No. 09/390,271, entitled "A Technique for Watermarking an Image and a Resulting Watermarked Image" filed Sep. 7, 1999;

U.S. patent application Ser. No. 09/390,272, entitled "A Technique for Detecting a Watermark in a Marked Image" filed on Sep. 7, 1999;

U.S. patent application Ser. No. 09/843,234, entitled "Robust Recognizer of Perceptually Similar Content" filed on Apr. 24, 2001;

U.S. patent application Ser. No. 09/843,279, entitled "Derivation and Quantitation of Robust Non-Local Characteristics for Blind Watermarking" filed on Apr. 24, 2001;

U.S. patent application Ser. No. 09/843,254, entitled "Recognizer of Audio-Content in Digital Signals" filed on Apr. 24, 2001

U.S. patent application Ser. No. 09/259,669, entitled "A System and Method for Producing Modulated Complex Lapped Transforms" filed on Feb. 26, 1999; and U.S. patent application Ser. No. 09/421,986, entitled "System and Method for Hashing Digital Images" filed on Oct. 19, 1999.

Introduction

Described herein are one or more exemplary implementations of a recognizer of text-based work. One of such exemplary implementations may be referred to as an exemplary "text recognizer."

One implementation of an exemplary text recognizer described herein, automatically and accurately detects plagiarism in text-based work based upon the text content of such work. Another implementation of an exemplary text recognizer, described herein, automatically and accurately categorizes text-based work based upon the text content of such work.

Figure 7:
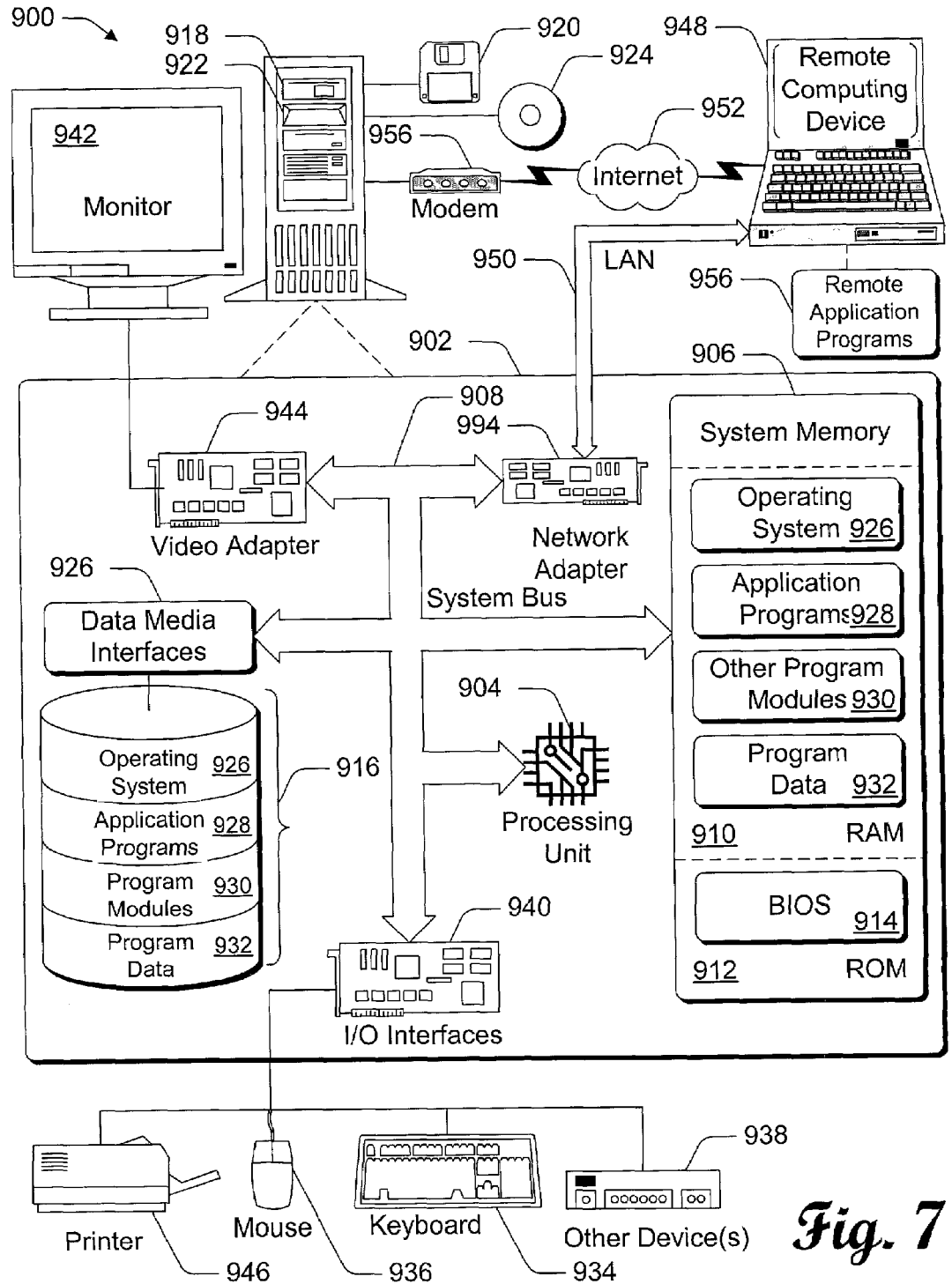
FIG. 7 is an example of a computing operating environment capable of implementing an implementation of a recognizer of text-based work.

These exemplary implementations may be implemented (whole or in part) by a text recognition system 100 and/or by a computing environment like that shown in FIG. 7.

Brief Overview

An exemplary text recognizer determines one or more recognition representations (e.g., hash values) for the contents of a text document. These representations may include an intermediate and a final hash value. In general, it does this by:

filtering out non-essential words, punctuation, and such;
putting it into a standard format;
extracting sub-text via a self-synchronized approach, such as:
   fixed-length sub text extraction; or
   variable-length sub text extraction;
arranging the extracted sub-text into a standard format (i.e., an image)
hashing the sub-text or image One of the results of hashing the image (or the sub-text itself) is a final hash value, which uniquely identifies the body of the text document. This hash value does not rely on any particular order of text, any punctuation, any non-essential words. In addition, the selected words (i.e., sub-text) that are the basis for the hash value calculation are chosen via a pseudorandom and/or cryptographic fashion; thus, making it exceptionally difficult for a plagiarize to predict which words are essential.

Furthermore, another result of hashing the image is an intermediate hash value, which generally identifies the body of the text document. Bodies of text having semantically similar content have similar intermediate hash values. Thus, their hash values cluster together.

Perceptually Same and Perceptually Distinct

The exemplary text recognizer treats two "perceptually same" bodies of text as the same if a human observer reasonably views them as the same. This may also be called "perceptually identical," "imperceptibly indistinguishable," or other similar equivalent phrases. For example, "perceptually same" bodies of text are documents that look as if they are they are substantially same to a human.

In contrast, a "perceptually distinct" digital goods is generally the converse of "perceptually same" digital goods. This may also be called "perceptually different" or "perceptually distinguishable".

Perceptually Similar

The exemplary text recognizer treats two "perceptually similar" bodies of text as documents that should be categorized as similar. Herein, a pair of bodies of text are "perceptually similar" when their their "similarity-recognition" values are close in value (i.e., proximal). In other words, the phrase "perceptually similar" stresses the fact that two documents should produce the proximally near hash values.

Exemplary Text Recognition System

Figure 1:
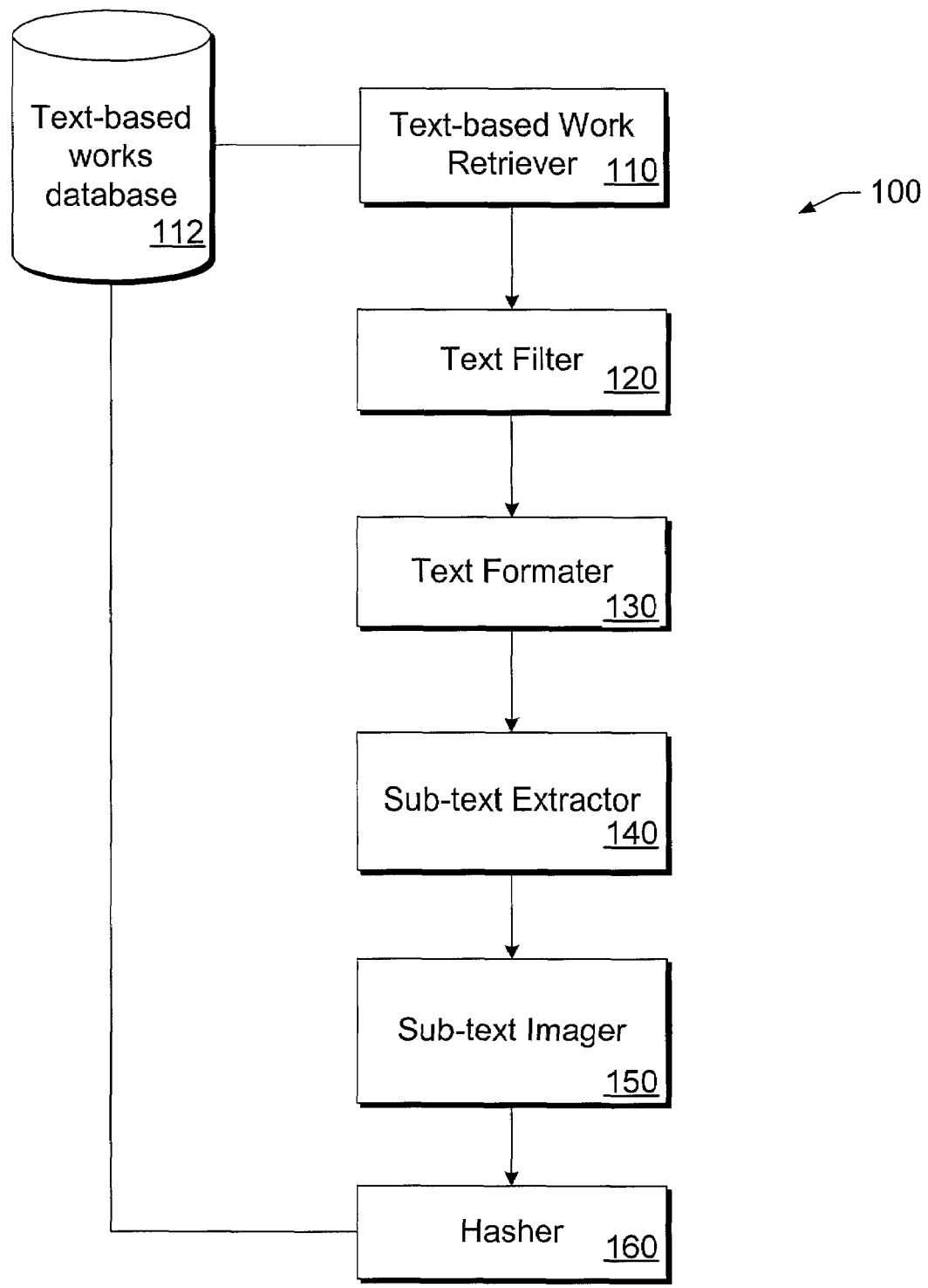
FIG. 1 is a schematic block diagram showing an embodiment of a recognizer of text-based work.
Figure 2:
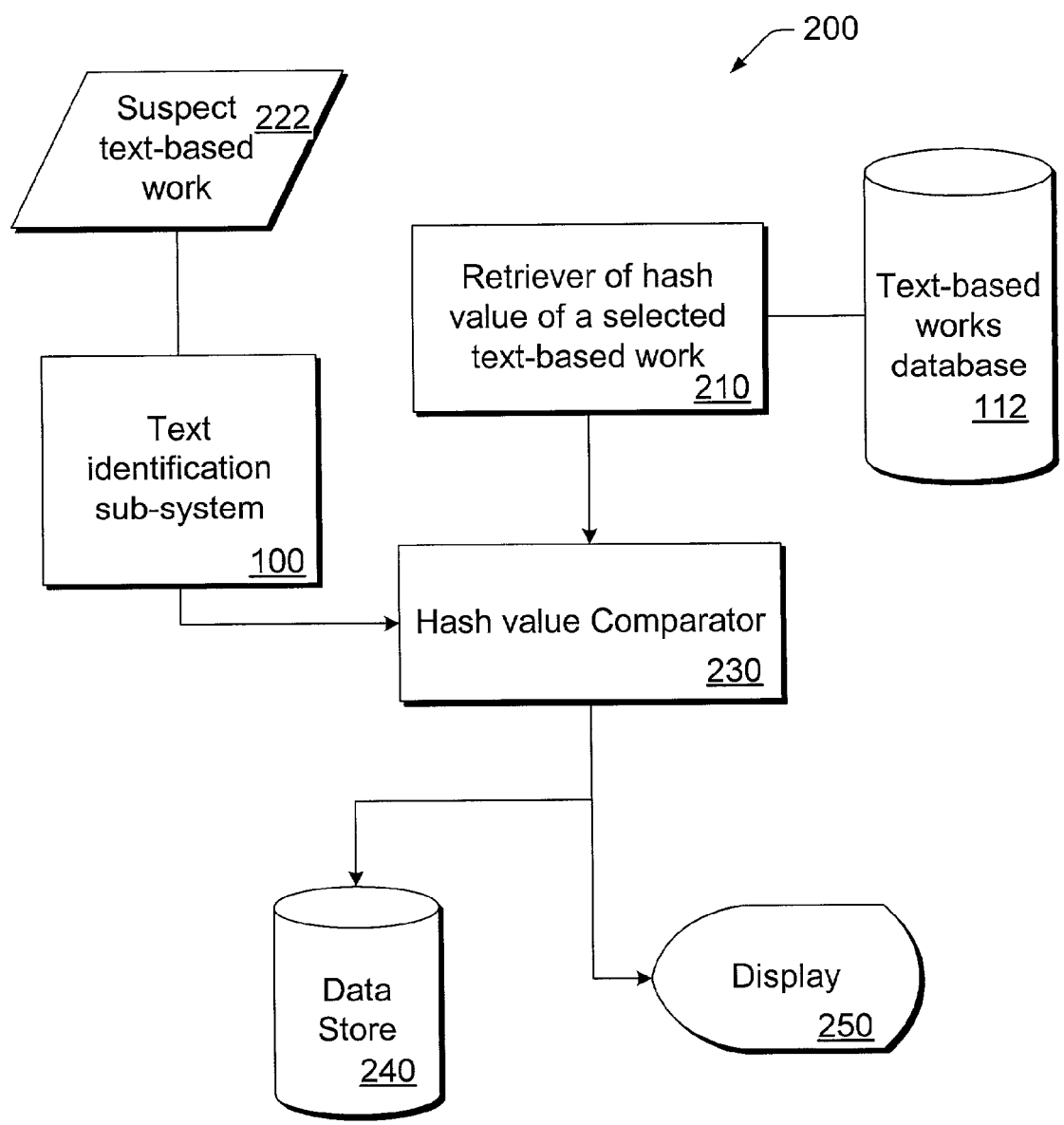
FIG. 2 is a schematic block diagram showing another embodiment of a recognizer of text-based work.
Figure 3:
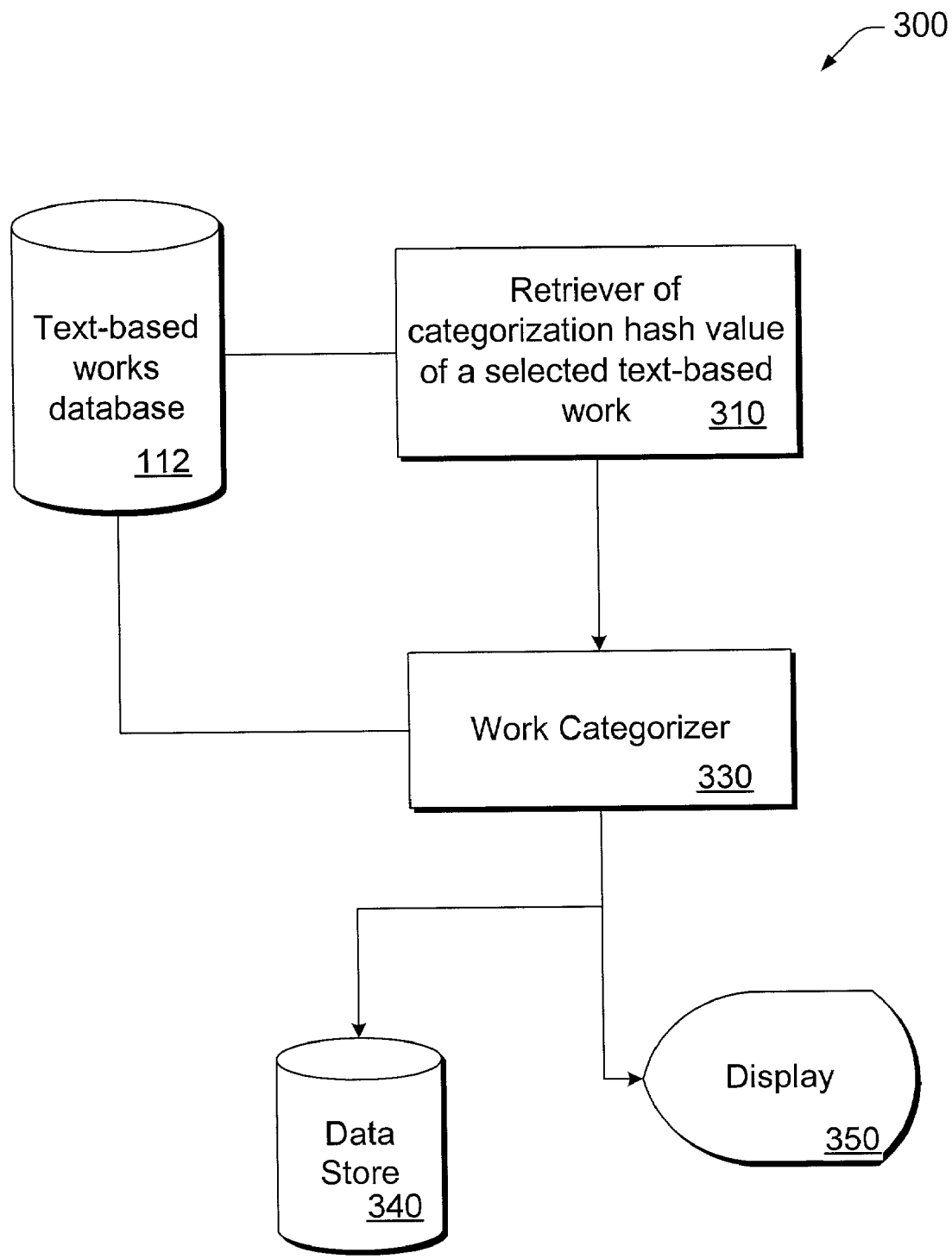
FIG. 3 is a schematic block diagram showing still another embodiment of a recognizer of text-based work.

FIGS. 1-3 show a text identification sub-system 100, a similarity detection (alternatively, a plagiarism detection) sub-system 200, and a text categorization sub-system 300. The sub-systems alone or in combination with each other form an embodiment of an exemplary text recognizer. Each embodiment may be implemented in software, hardware, or a combination thereof.

Text Identification Sub-System

FIG. 1 shows the text identification sub-system 100, which is an embodiment (or a portion thereof) of the exemplary text recognizer. This embodiment includes a text-based work retriever 110 for retrieving text-based works from a database of text-based works, such as database 112, or some other source of text-based works.

A text-based work may also be called a "body of text", a "text document", "text file", or other similar labels that refers to an object having content consisting primarily of text. In particular, the text is electronically encoded in a manner readable by a computer.

Once a subject work is chosen, a text filter 120 filters out the non-essential (i.e., superfluous) elements, which includes non-essential and/or non-distinctive words, punctuations, symbols, and the likeFor a given application, the definition of non-essential elements may be customized. Examples of non-essential elements include common words and virtually everything that is not a word. Examples of common words include:
- articles (e.g., "a", "an", "the");
- pronouns (e.g., "I", "he", "she");
- prepositions (e.g., "of", "on", "for");
- conjunctions (e.g., "and", "or", "but");
- common verbs (e.g., "is", "are", "were"); and
- other such common words.

After filtering the original text, a text formatter 130 formats the remaining text into a canonical (i.e., standard) format. For example, the canonical format may ignore all characters that are not letters or spaces. In the cononical format all of the letters may be converted to uppercase.

An example of some original text may be as follows:
A text-based work may also be called a "body of text", a "text document", "text file", or other similar labels that refers to an object having content consisting primarily of text. In particular, the text is electronically encoded in a manner readable by a computer.

One possible example of canonical, filtered text that could result from the above example (filtered out common words, converted to all caps, no characters but letters and spaces) is:
TEXT BASED WORK MAY ALSO CALLED BODY TEXT TEXT DOCUMENT TEXT FILE OTHER SIMILAR LABELS REFERS OBJECT HAVING CONTENT CONSISTING PRIMARILY TEXT PARTICULAR TEXT ELECTRONICALLY ENCODED MANNER READABLE COMPUTER A sub-text extractor 140 extracts the selected sub-text from the canonically formatted text. The extractor 140 uses a cryptographic key to guide its selection of sub-text from the canonically formatted text. This uses conventional cryptographic techniques, such as a pseudo-random number generator.

This extraction may be accomplished using a fix-length approach or a variable-length approach. Both of these approaches are self-synchronized. This extraction technique (and these two approaches) is described in detail later in the Text Sifting section.

A sub-text imager 150 may arrange the extracted sub-text into a standard format called an "image." For example, the "image" may be literally an image of the extracted sub-text within a standard format, standard font, standard background, etc. The text in the image may be black against a white background. Alternatively, the text and background may have different colors and different contrasts.

The standard format may also be called "formatted sifted text." A hasher 160 finds hash values of such an image. The resulting hash values of the hasher 160 include an intermediate hash value (i.e., categorization hash value) and a final hash value. These hash values are recognition representations of the text of the original body of text. That is because these hash values may be used to recognize (and even identify) the text within a body of text.

Hashing

Hashing techniques have been used to protect the rights of content owners. In general, a hashing technique maps a large block of raw data into relatively small and structured set of identifiers. These identifiers are also referred to as "hash values" or simply "hash." By introducing a specific structure and order into raw data, the hashing function drastically reduces the size of the raw data into short identifiers. It simplifies many data management issues and reduces the computational resources needed for accessing large databases.

Mathematically, a hashing technique include a hashing function $H_K(\bullet)$. That function takes a signal x as input and computes a short vector $h=H_K(x)$. That vector is an apparently random value, which is indexed by a secret key K, in some large set. That vector h is a hash value.

The hash values produced by such techniques are viewed as useful because they typically have following desirable characteristics:
- Apparently Uniformly Distributed—For any given input, the output hash value are uniformly distributed among the possible L-bit outputs.
- Approximate Pairwise Independent—For two distinct inputs, the corresponding outputs are statistically almost independent of each other.

Additional details regarding calculating hash values are discussed in the pending U.S. Patent applications that are incorporated by reference.

$_{[kcc1]}$The resulting hash values may be displayed and stored. These values are stored in the database 112 (or some other database) and associated with the original suspect work from which the values were calculated.

Alternatively, the text identification sub-system 100 may skip hasher 160 and store the sub-text image (i.e., formatted sifted text) in database 112 in association with the original work. This sub-text image may be used later to compare with the sub-text image of another work to detect similarity (e.g., plagiarism) (or to categorize the work).

Similarity Detection Sub-System

FIG. 2 shows the similarity detection sub-system 200, which is an embodiment (or a portion thereof) of the exemplary text recognizer. This embodiment includes a hash-value retriever 210 for retrieving a hash-value of a selected text-based work. More particularly, it retrieves the final hash value of such work from a database of text-based works, such as the database 112 (shown in FIGS. 1-3), or some other source of text-based works.

FIG. 2 also shows the text identification sub-system 100 (shown in FIG. 1 and described above). It calculates a final hash value of a suspect text-base work 222. This work is one that is suspected of plagiarizing a work found in a database of text-based works—such as the database 112 (shown in FIGS. 1-3) or some other source of text-based works.

The text identification sub-system 100 provides the final hash value of the suspect work 222 to a hash value comparator 230. Likewise, the retriever 210 provides the final hash value of the selected work to the comparator 230. Of course, this can be reversed so that the sub-system 100 provides the hash value of the selected work while the retriever 210 provides the hash value of the suspected work.

As its name suggests, the comparator 230 compares the hash values of the two works to determine if they substantially match. Substantially matching means that the two hash values are close enough in value to reasonably conclude that the two works have the same hash values within a margin of error. This margin of error may be subjectively determined by a user or designer for a specific application.

The results of the comparison are displayed on a display 250 and stored in a data store 250. The results indicate whether the content of the suspect work 222 is plagiarized from the selected work.

Alternatively, the similarity detection sub-system 200 may use the sub-text itself or the sub-text image (i.e., formatted sifted text) of a work rather than its hash value. With this alternative embodiment, the sub-text images of the work may be compared or the hash values of the works may be calculated and those values compared.

Text Categorization Sub-System

FIG. 3 shows the text categorization sub-system 300, which is an embodiment (or a portion thereof) of the exemplary text recognizer. This embodiment includes a hash-value retriever 210 for retrieving a hash-value of a selected text-based work. More particularly, it retrieves the intermediate (i.e., categorization) hash value of such work from a database of text-based works, such as the database 112 (shown in FIGS. 1-3), or some other source of text-based works. Of course, the retriever 210 could retrieve an intermediate hash value of a work processed by the text identifier sub-system 100.

A work categorizer 330 uses the categorization hash value of the selected work to group such work with others of similar (i.e., proximal) categorization hash values. In other words, based upon the categorization hash value of a given work, the work categorizer 330 groups the given work with other works having similar categorization hash values. Thus, the hash values of all works in each grouping are clustered together (i.e., proximal each other). Although these groupings are objectively determined, the subjective nature of the content of works within a grouping will be similar to that of the content of others within the grouping.

The boundaries between groupings are determined manually or automatically. Manually, a person selects the boundary between groupings using the natural clustering seen after many works have been categorized. Automatically, a system mathematically selects the boundary between groupings to be some point between (perhaps halfway) the centers of the groupings. Of course, other such techniques may to used to determine boundaries. These techniques may be fully automatic, fully manual, or some combination.

The work categorizer 330 displays the results on a display 350 and stores it in a data store 340 and/or database 112.

Alternatively, the text categorization sub-system 300 may use the sub-text itself or the sub-text image (i.e., formatted sifted text) of a work rather than its hash value. With this alternative embodiment, the categorization hash value of a work is calculated and the result is used to categorize the work.

Methodological Implementation of the Exemplary Text Recognizer

Figure 4:
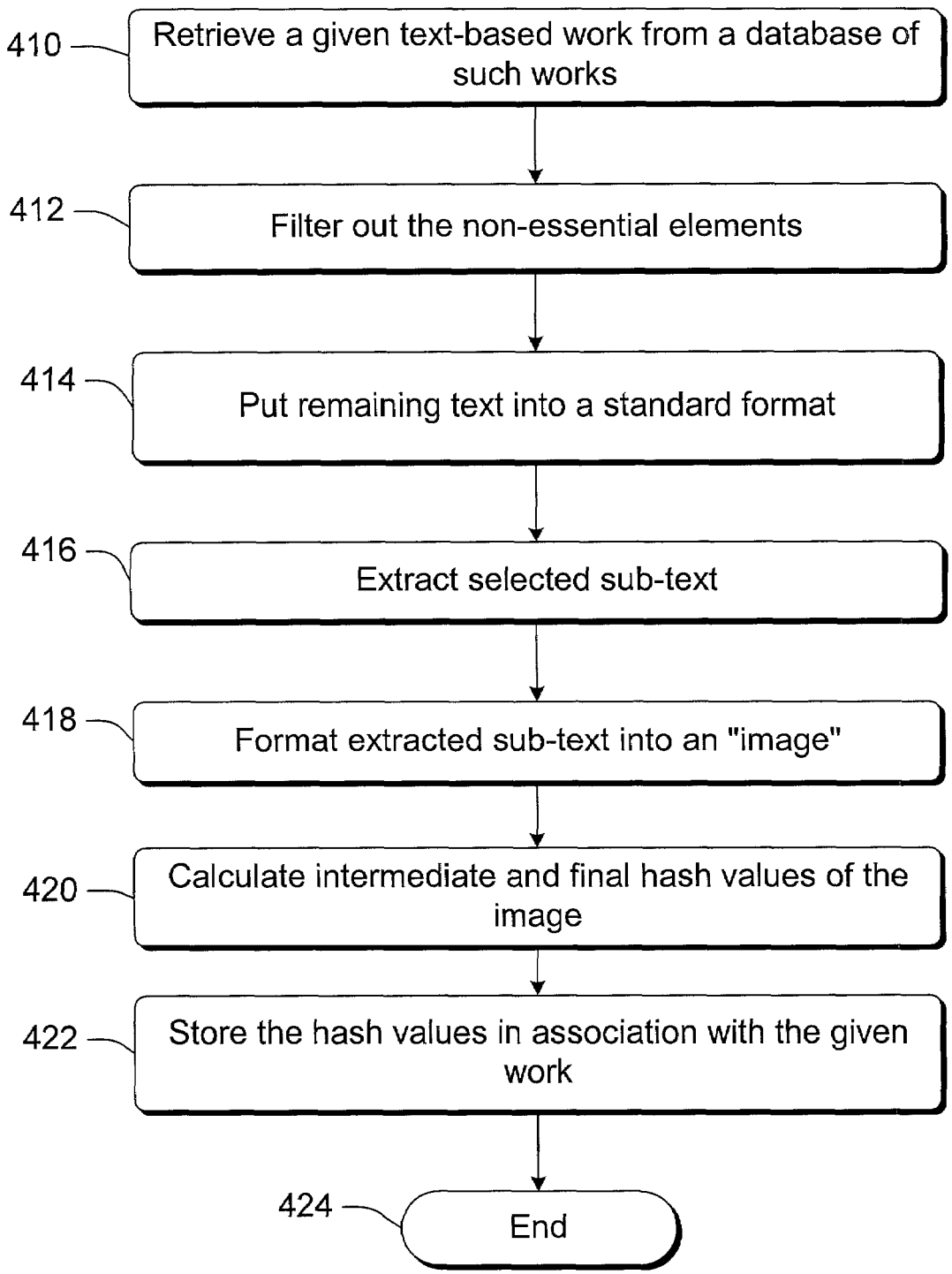
FIG. 4 is a flow diagram showing an illustrative methodological implementation of a recognizer of text-based work.

FIG. 4 shows an illustrative methodological implementation of the exemplary text recognizer performed by the text identification sub-system 100, the similarity detection sub-system 200, or the text categorization sub-system 300 (or some combination of such sub-systems). This methodological implementation may be performed in software, hardware, or a combination thereof.

Text Identification Methodological Implementation

FIG. 4 illustrates a text identification methodological implementation of the exemplary text recognizer. At 410 of FIG. 4, the exemplary text recognizer retrieves a subject text-based work from a database of text-based works or some other source of such works. Once a subject work is chosen, the exemplary text recognizer, at 412, filters out the non-essential (i.e., superfluous) elements, which includes non-essential and non-distinctive words, punctuations, symbols, and the like. Examples are provided above in the discussion of text filter 120 of FIG. 1.

At 414 of FIG. 4, the exemplary text recognizer formats the remaining text into a canonical (i.e., standard) format. At 416, it extracts selected sub-text from the canonically formatted text. The extraction uses a cryptographic key to guide its selection of sub-text from the canonically formatted text. This extraction may be accomplished using a fix-length approach or a variable-length approach. This extraction technique (and these two approaches) is described in detail later in the Text Sifting section.

At 418 of FIG. 4, the exemplary text recognizer arranges the extracted sub-text into a standard format called an "image." At 420, it calculates a hash value of such image. The hash values include an intermediate hash value (i.e., categorization hash value) and a final hash value. These hash values are recognition representations of the text of the original body of text. That is because these hash values may be used to recognize (and even identify) the text within a body of text.

At 422 of FIG. 4, the resulting hash values are displayed and stored. These values are stored in a database in association with the original subject work from which the values were calculated. These hash values may be used later to compare with the hash values of another work to detect similarity (or to categorize the work).

Alternatively, the text identification methodological implementation may skip the hash value calculation block 420 and store, at block 422, the sub-text itself or the sub-text image (i.e., formatted sifted text) in association with the original work. This sub-text image may be used later to compare with the sub-text image of another work to detect similarity (e.g., plagiarism) (or to categorize the work).

Similarity Detection Methodological Implementation

Figure 5:
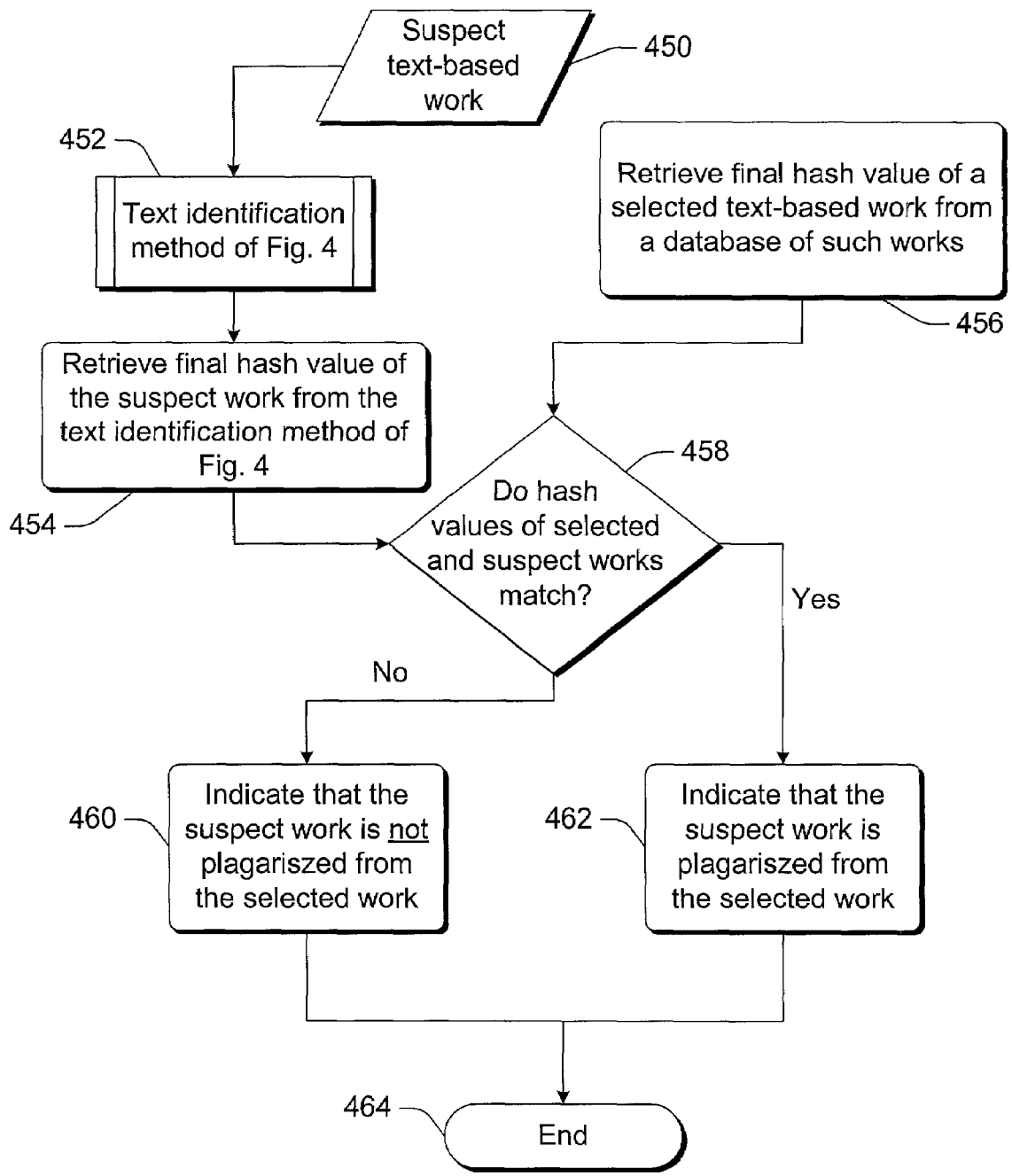
FIG. 5 is a flow diagram showing another methodological implementation of a recognizer of text-based work.

FIG. 5 illustrates a similarity detection methodological implementation of the exemplary text recognizer. At 456 of FIG. 5, the exemplary text recognizer retrieves a hash value of a selected text-based work. More particularly, it retrieves the final hash value of such work from a database of text-based works or some other source of such works.

FIG. 5 also shows the text identification method of FIG. 4 at block 452. The method 452 calculates a final hash value of a text-based work 450 that is suspected of being copied from the selected work retrieved by block 456. At 454, the exemplary text recognizer retrieves the calculated final hash value of the suspect text-base work 450 from the text identification method of block 452. Of course, this can be reversed so that the method 452 provides the hash value of the selected work while block 452 provides the hash value of the suspect work.

At 458, the exemplary text recognizer compares the hash values of the two works (suspect work 450 and selected work of 456) to determine if they substantially match. Substantially matching means that the two hash values are close enough in value to reasonably conclude that the two works have the same hash values within a margin of error.

If the result of such comparison is no substantial match, then the exemplary text recognizer indicates, at 460, that the suspect work 450 is not a substantial copy of the selected work of 456. In other words, no plagiarism is detected if the final hash values of compared works do not substantially match. At 464, this process ends.

However, if the result of such comparison is a substantial match, then the exemplary text recognizer indicates, at 462, that the suspect work 450 is a substantial copy of the selected work of 456. In other words, plagiarism is detected if the final hash values of compared works substantially match. At 464, this process ends.

Alternatively, the similarity detection methodological implementation may use the sub-text itself or the sub-text image (i.e., formatted sifted text) of a work rather than its hash value. With this alternative embodiment, the sub-text images of work may be compared or the hash values of the works may be calculated and those values compared.

Text Categorization Methodological Implementation

Figure 6:
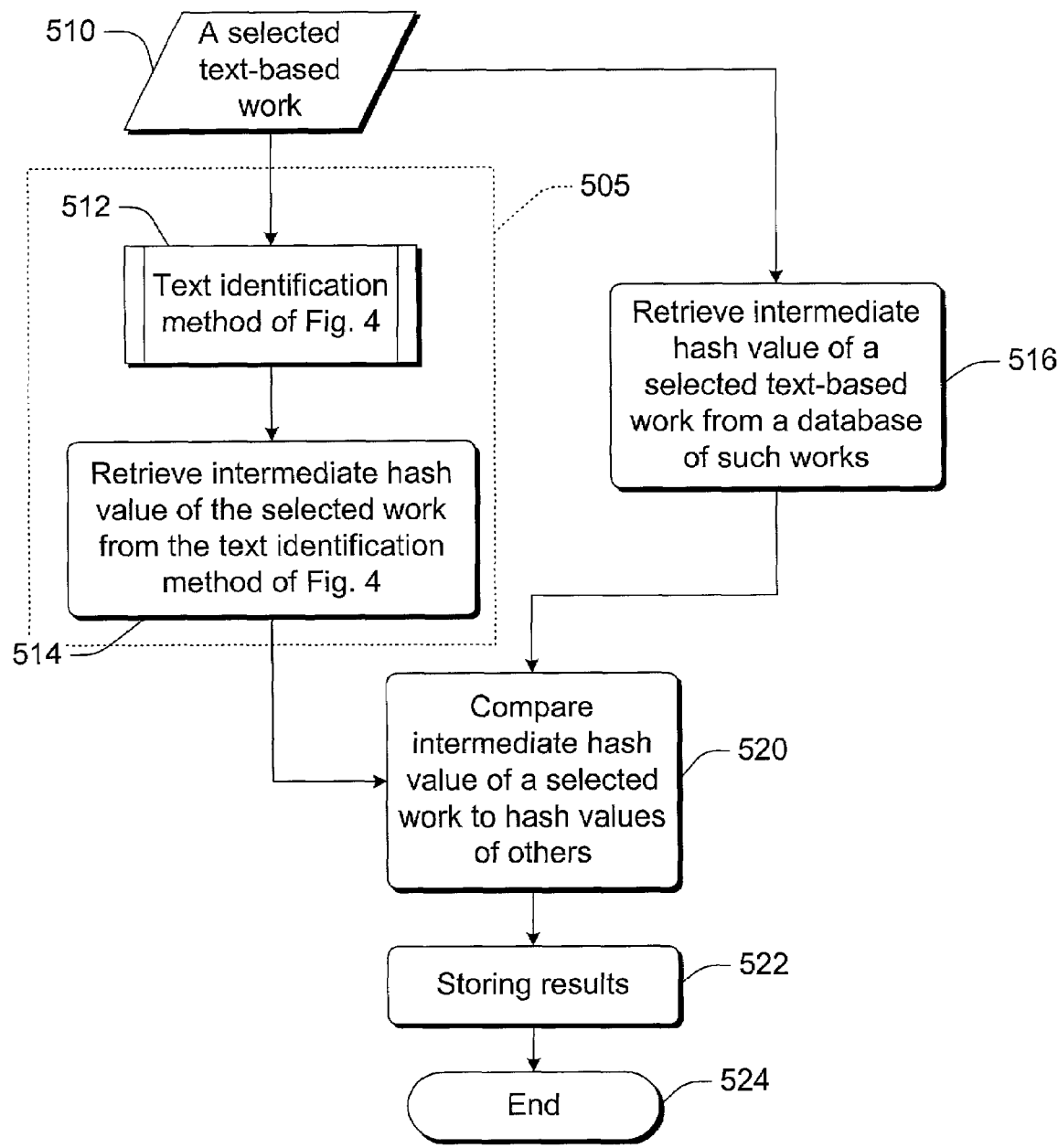
FIG. 6 is a flow diagram showing still another methodological implementation of a recognizer of text-based work.

FIG. 6 illustrates a text categorization methodological implementation of the exemplary text recognizer. At 516 of FIG. 6, the exemplary text recognizer retrieves a hash value of a selected text-based work. More particularly, it retrieves the intermediate (i.e., categorization) hash value of such work from a database of text-based works or some other source of such works.

In dashed box 505, FIG. 6 also shows an alternative way of getting an intermediate hash value of the selected work. This is by processing the work using the text identification method of FIG. 4 at block 512. The method 512 calculates an intermediate (i.e., categorization) hash value of the selected work. At 514, the exemplary text recognizer retrieves the calculated intermediate hash value of the selected text-base work 510 from the text identification method of block 512.

At 520, the exemplary text recognizer uses the intermediate hash value of the selected work to group such work with others of similar (i.e., proximal) intermediate hash values. In other words, based upon the intermediate hash value of a given work, the exemplary text recognizer groups the given work with other works having similar intermediate hash values. Thus, the hash values of all works in a given grouping are clustered together (i.e., proximal each other). Although these groupings are objectively determined, the subjective nature of the content of works within a grouping will be similar to that of the content of others within the grouping.

See the above description of the text categorization sub-system (of FIG. 3) to see how the boundaries between groupings may be determined.

At 522, the exemplary text recognizer stores the categorization results in a database. At 524, the process ends.

Alternatively, the text categorization methodological implementation may use the sub-text itself or the sub-text image (i.e., formatted sifted text) of a work rather than its hash value. With this alternative embodiment, the categorization hash value of a work is calculated and the result is used to categorize the work.

Text Sifting

A technique called "cryptographic text sifting" (or simply "text sifting" herein) takes a large body of text and characterizes it in a simpler and identifying form. The characterization may be by a text subset selected from such body of text. From this subset, one or more hash values may be calculated.

Text-sifting technique is performed, wholly or in part, by the text identification sub-system 100 shown in FIG. 1. This includes: the text filter 120, the text formatter 130, the sub-text extractor 140, the sub-text imager 150, and the hasher 160. Furthermore, the text-sifting technique is performed, wholly or in part, by the text identification methodological implementation illustrated in FIG. 4.

The cryptographic text-sifting technique takes as input a text document (i.e., a text-based work) and a secret key. It selects and outputs a small number of words from the document. Without access to the secret key, an adversary (e.g., a plagiarist) cannot predict which words will be selected. The adversary can only affect the output by making changes to document.

This helps immensely in the effort to detect copyright infringement. Instead of combing through an entire database to see if a file has been plagiarized, the database might contain sifting versions of all documents alongside the complete versions. Searching for matches in the sifted versions is much faster than searching through the complete files. Alternatively, hash values of such sifted version may be stored instead of and/or in addition to the sifted versions themselves. Consequently, the hash values may be compared instead of the sifted versions. Furthermore, if sifted versions are stored, hash values can be calculated and then compared.

If a substantial match is found, the complete versions can then be compared. If an adversary wanted to change a plagiarized document so much that the sifting versions had nothing common, the adversary would need to change so much of the document that a person is unlikely to recognize the original.

These text-sifted versions of the original text are recognition representations of the text of the original body of text. That is because they may be used to recognize (and even identify) the text within a body of text.

There are two main approaches to text sifting. Both are self-synchronizing. The first approach is constant length text sifting. It may also be called the fixed-length approach. With this approach, the number of words outputted by the sifting technique is constant. Second approach is proportional length text sifting. It may also be called the variable-length approach. With this approach, the sifting technique outputs a number of words proportional to the length of the document.

General Introduction to Text Sifting

For the exemplary text recognizer, the text-sifting technique takes as input a text document (i.e., a text-based work) and a secret key. It outputs a subset of words from that document. This subset may be further formatted into a standard "image," which may be called "formatted sifted text."

The text-sifting technique uses hash functions to decide which words will be selected. The specific words that are chosen are always the same when the same document and key are used. An adversary, who has access to the document, but not the secret key, cannot predict which words will be selected.

Groups of m Words

In the exemplary text recognizer, text-sifting technique works on groups of m words (m-tuples of words) instead of only single words. Those groups of words need not be contiguous. For example, consider the following sentence:

She sells seashells by the seashore

The sentence consists of the following 2-tuples:

She sells
Sells seashells
seashells by
by the
the seashore

It also consists of the following 3-tuples:

she sells seashells
sells seashells by
seashells by the
by the seashore

If a document has N words, there are (N−m) m-tuples in the document. Since m is small compared to N, n is approximately equal to N. Excluding the words at the very beginning or the end of a document, each word is part of m of the m-tuples. This difference is minor, again because m is small compared to N.

There several reasons for operating on m-tuples instead of single words. First, since m can be set equal to one, this does not preclude single words, and makes the text-sifting technique more general. Second, m-tuples of words are more easily distinguishable that are single words, which is useful in applications of text sifting (such as similarity detection). Finally, using m-tuples in effect links a word to his neighbors, which helps the text-sifting technique take a word's place in a document into account.

In addition, different sizes of m-tuples may be used in the same document. For example, a document may be evaluated several times, first with m=3 then m=5 then m=15, and taking the results of all three times into account.

An alternative approach to m-tuples is "windowing." With this approach, a window onto the text is used and a specific number of words are selected from that window. For example, a window may be twenty words long and only seven words are selected from that window.

Removal of Superfluous Details

In addition to working on groups of m words, the exemplary text recognizer ignores superfluous details that will not distinguish documents from each other. Such superfluous details may be called non-essential (i.e., superfluous) elements.

This is accomplished in two separate ways. First, before any text in a document is sifting, all white space is converted to single spaces, all characters that are not letters or spaces are purged from the document, and all letters are converted to uppercase. Second, all words found in a list of common words are removed from the document. This removal of superfluous details helps insure that the words that are selected deal with the substantive intellectual content of the document, rather than the formatting or unimportant words that can easily changed.

In addition, the format (i.e., type) of document may be identified. Examples of formats include HTML, postscript, ASCII, etc. Doing this, the document may be analyzed and customize according to its identified format so that non-essential elements may be removed intelligently.

For a postscript document, this would consist of removing the postscript commands from the document, and likewise it would remove the HTML commands from an HTML document. For other text-based documents, it could remove all of the formatting characters, etc.

If removal of non-essential elements is not conditioned on the format of the documents, then a match might be made simply based upon formatting similarities.

Further Defining Text-Sifting Technique

A cryptographic text-sifting technique f takes as input a secret key K and a document D consisting of n (=N−m) m-tuples, $w_1, w_2, w_3, \ldots, w_n$. The output f(D, K) is S, a subset of D that consists of k of the $w_i$. For an adversary without K, the k m-tuples in S appear to be chosen uniformly at random from all m-tuples in D.

Note that a specific word in D might be selected more than once. For example, consider the previous example. If 2-tuples are being used, the text-sifting technique could use "she sells" and "sells seashells," causing the word "sells" to appear twice.

In addition, a specific m-tuple may appear more than once.

Proportional-Length Sifting Approach

The proportional-length sifting approach may also be called the variable-length approach. This approach generates output of a size proportional to the size of input (the original document). The size of the output is on average proportional to the size of the input. That is, the expected value of the size is proportional to the size of the input. The larger the document is, the less variation there is in this proportionality.

A proportional-length cryptographic text-sifting technique is a cryptographic text-sifting technique where k is proportional to n for all documents D. k=cn for some constant c, such that 1/c is an integer.

To achieve a proportional length text-sifting technique, the exemplary text recognizer hashes each m-tuple and looks at the value modulo (1/c). For example, if a proportional length text-sifting technique should output one m-tuple for each 20 m-tuples in D, then c=0.05 and an m-tuple will be selected only if its hash value is congruent to 0 mod 20.

1/c is not an integer, then accept an m-tuple if its hash is less than x mod y, where c=x/y.

A hash function is used to determine which words will be selected. This unrelated to the final and intermediate hash values calculated by the hasher 160 and by block 430. To distinguish them, the hash values used to determine which words would be selected is called the "selected hash values."

To compute the selected hash value for each word, the hash function is performed. It takes as input the secret key k and an m-tuple and outputs a b-bit number. It treats the m-tuple as a number by considering each character to be a digit in a base corresponding to a range of characters. For example, the range may be 0 to 26 for the letters and thespace character) and therefore a digit in a base-27 number.

The m-tuple corresponds to this number, called x. The function also computes k random coefficients, chosen uniformly and the range of $[0, 2^b]$, called $c_1, c_2, c_3, \ldots, c_k$. Finally, the function chooses a random b-bit prime number p. The select hash value, h, is:

$$h = c_0 x^k + c_1 x^{k-1} + c_2 x^{k-2} + \ldots + c_{k-2} x^2 + c_{k-1} x^1 + c_k \bmod p$$
$$\bmod(1/c)$$

To speed up the process, Horner's method is used to evaluate h. Homer's method iteratively re-evaluates h in place as follows:

| | | |
|---|---|---|
| Step 1 | $h = c_0$ | mod p |
| Step 2 | $h = hx + c_1 = c_0 x + c_1$ | mod p |
| Step 3 | $h = hx + c_2 = c_0 x^2 + c_1 x + c_2$ | mod p |
| Step 4 | $h = hx + c_3 = c_0 x^3 + c_1 x^2 + c_2 x + c_3$ | mod p |
| ⋮ | ⋮ | ⋮ |
| Step $k-1$ | $h = hx + c_{k-1} = c_0 x^{k-1} + c_1 x^{k-2} + c_2 x^{k-3} + \ldots + c_{k-3} x^2 + c_{k-2} x^1 + c_{k-1}$ | mod p |
| Step $k$ | $h = hx + c_k = c_0 x^k + c_1 x^{k-1} + c_2 x^{k-2} + \ldots + c_{k-2} x^2 + c_{k-1} x^1 + c_k$ | mod p |

A final value of h is taken mod (1/c) and if the result is zero, is output.

Alternatively, this may be described as follows: c is e a rational number of the form c=a/b, where both a and b are integers. An m-tuple is output if its hash value is less than a mod b. Another way of saying it: an m-tuple is output if it is $0, 1, 2, \ldots, a-2 \bmod b$.

Constant-length Sifting Approach The constant-length sifting approach may also be called the fixed-length approach. It may be desirable to have a text-sifting technique that always outputs a constant number of m-tuples. The constant-length sifting approach achieves this. With the constant-length cryptographic text-sifting technique, k is fixed for all documents D.

To do this, the approach uses the secret key to hash every m-tuple in the document. It selects the m-tuple with the smallest hash value. Alternatively, it could select the largest hash value or some other relative measure.

To expand this approach to output k m-tuples, the exemplary text recognizer simply repeats the function k times with k different hash functions.

Like the previously discussed proportional-length sifting approach, a hash function is used to determine which words will be selected in the constant-length sifting approach. This unrelated to the final and intermediate hash values calculated by the hasher 160 and by block 430. To distinguish them, the hash values used to determine which words would be selected is called the "selected hash values."

It may be very slow to hash every m-tuple with k different hash functions; so two strategies are employed for achieving a reasonable level of speed. The first is to use a very fast hash function. The second is to correlate the hash functions so that computing k select hash values at once is faster the computing k separate select hash values.

To generate all these select hash values, $h_1, h_2, h_3, \ldots, h_k$, a single task computes several hash functions. The single task takes as input the secret key k and an m-tuple and outputs a b-bit number. It treats the m-tuple as a number, x, just as the proportional-length sifting approach. The task also computes 2k-1 random coefficients, chosen uniformly the range of $[0, 2^b]$, called $c_1, c_2, c_3, \ldots, c_{2k-1}$. Finally, the task chooses a random b-bit prime number p.

To compute the select hash values, the following is done:

$$\begin{aligned}
h_1 &= c_0 x^k + c_1 x^{k-1} + c_2 x^{k-2} + \ldots + c_{k-2} x^2 + c_{k-1} x^1 + c_k & \bmod p \\
h_2 &= c_1 x^k + c_2 x^{k-1} + c_3 x^{k-2} + \ldots + c_{k-1} x^2 + c_k x^1 + c_{k+1} & \bmod p \\
h_3 &= c_2 x^k + c_3 x^{k-1} + c_4 x^{k-2} + \ldots + c_k x^2 + c_{k+1} x^1 + c_{k+2} & \bmod p \\
&\vdots & \bmod p \\
&\vdots & \bmod p \\
h_{k-1} &= c_{k-1} x^k + c_k x^{k-1} + c_{k+1} x^{k-2} + \ldots + c_{2k-4} x^2 + c_{2k-3} x^1 + c_{2k-2} & \bmod p \\
h_k &= c_k x^k + c_{k+1} x^{k-1} + c_{k+2} x^{k-2} + \ldots + c_{2k-3} x^2 + c_{2k23} x^1 + c_{2k-1} & \bmod p
\end{aligned}$$

The first step of this process is to compute $x^2 \bmod p, x^3 \bmod p, x^4 \bmod p, \ldots, x^k \bmod p$, Next, the $x^i$ are multiplied by $c_j$ and summed modulo p to form $h_1$ as above. Thus, computing $h_1$ requires (2k-1) modular multiplications and k modular additions.

Computing each successive $h_i$ is done according to following formula:

$$h_{i+1} = h_i x + c_{i+k-1} - (c_{i-1} x^k) \bmod p$$

Since $x^k$ was already calculated, each successive $h_i$ takes 2 modular multiplications, one modular addition, and one modular subtraction.

Total cost=(cost of computing $h_i$)+(k-1)(cost of computing successive $h_i$)

Self-Synchronization

Both of these approaches are self-synchronizing. This means that it outputs words (or m-tuples) based on their own inherent features, not based on other features of the document. For example, adding a word at the beginning of the document will not completely change all of the output. As are result, the body of text is less sensitive to de-synchronizing attacks (e.g., scrambling, rearranging, deletions, insertions, etc.)

Exemplary Computing System and Environment

FIG. 7 illustrates an example of a suitable computing environment 900 within which an exemplary text recognizer, as described herein, may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The exemplary text recognizer may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary text recognizer may be described in the general context of computer-executable instructions, such as program modules, being executed by a computer. Generally, program modules include routines, programs, objects, components, data structures, etc. that perform particular tasks or implement particular abstract data types. The exemplary text recognizer may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 7 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternatively, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of text-based work retriever, text filter, text formatter, sub-text extractor, sub-text imager, hasher, text sifter, text identification sub-system, similarity detection sub-system, categorization sub-system, recognition representation determiner, hash value comparator, hash value retriever, text works database, and work categorizer.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Computer-Executable Instructions

An implementation of an exemplary text recognizer may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 7 illustrates an example of a suitable operating environment 900 in which an exemplary text recognizer may be implemented. Specifically, the exemplary text recognizer(s) described herein may be implemented (wholly or in part) by any program modules 928-930 and/or operating system 926 in FIG. exemplary text recognizer or a portion thereof.

The operating environment is only an example of a suitable operating environment and is not intended to suggest any limitation as to the scope or use of functionality of the exemplary text recognizer(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary text recognizer may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method for hashing a body of text, the method comprising:

obtaining a body of text containing textual content in a computer-readable format, wherein the textual content of the obtained computer-readable formatted body of text is mutable via software tools for manipulation of textual content of bodies of text;

filtering the textual content of the body of text to remove elements of the textual content, wherein the filtering act produces filtered subtext, which is a subset of the textual content of the body of text;

formatting the filtered subtext into a defined image-based format, wherein the textual content of the defined image-based formatted filtered subtext is immutable via software tools for manipulation of the textual content of bodies of text;

deriving a hash value representative of the textual content of the filtered subtext, perceptually distinct filtered subtexts having hash values that are substantially independent of each other, wherein the deriving comprises hashing the image-based formatted, filtered subtext resulting from the formatting, wherein the filtering further comprises removing superfluous elements from the textual content, thereby leaving a remaining textual content and re-arranging the remaining textual content into a canonical format.

2. A method as recited in claim 1, wherein perceptually distinct image-based formatted, filtered subtexts have hash values that are independent of each other.

3. A method as recited in claim 1 further comprising comparing hash values of two image-based formatted, filtered subtexts to determine if such values match.

4. A computer-readable medium embedded with computer-executable instructions that, when executed by a computer, performs the method as recited in claim 3.

5. A method as recited in claim 1 further comprising comparing hash values of two image-based formatted, filtered subtexts to determine if such values substantially match.

6. A method as recited in claim 5 further comprising indicating whether such values substantially match.

7. A method as recited in claim 5 further comprising indicating suspicion of plagiarism between the two filtered subtexts when the compared hash values of the two image-based formatted, filtered subtexts substantially match.

8. A computer comprising one or more computer-readable media embedded with computer-executable instructions that, when executed by the computer, perform the method as recited in claim 1.

9. A method as recited in claim 1, wherein, before formatting, the textual content of the body of text comprises multiple words and sentences.

10. A method as recited in claim 1, wherein, before formatting, the textual content of the body of text comprises multiple words and sentences and the derived hash value is representative of the textual content of the body of text.

11. A computer-implemented method for hashing a body of text, the method comprising:

obtaining a body of text containing textual content in a computer-readable format;

filtering the textual content of the body of text to remove elements of the textual content, wherein the filtering act produces filtered subtext, which is a subset of the textual content of the body of text;

formatting the filtered subtext into a defined image-based format, wherein the textual content of the defined image-based formatted filtered subtext is immutable via software tools for manipulation of textual content of bodies of text;

deriving a hash value representative of the filtered subtext, perceptually similar filtered subtexts having proximally similar hash values, wherein the deriving comprises hashing the image-based formatted, filtered subtext resulting from the formatting, wherein the filtering further comprises removing superfluous elements from the textual content, thereby leaving a remaining textual content and re-arranging the remaining textual content into a canonical format.

12. A method as recited in claim 11 further comprising comparing hash value of an image-based formatted, filtered subtext to determine if such value is proximally near hash values of a group of image-based formatted, filtered subtexts having proximally clustered hash values.

13. A method as recited in claim 12 further comprising grouping the image-based formatted, filtered subtext with the group of image-based formatted, filtered subtexts if the hash value of such subtext is proximally near the values of the group.

14. A computer-readable medium embedded with computer-executable instructions that, when executed by a computer, performs the method as recited in claim 12.

15. A computer comprising one or more computer-readable media embedded with computer-executable instructions that, when executed by the computer, perform the method as recited in claim 12.

16. A method as recited in claim 11, wherein, before formatting, the textual content of the body of text comprises multiple words and sentences.

17. A method as recited in claim 11, wherein, before formatting, the textual content of the body of text comprises multiple words and sentences and the derived hash value is representative of the textual content of the body of text.

18. A computer-readable medium embedded with computer-executable instructions that, when executed by a computer, performs the method comprising:

obtaining a body of text containing textual content in a computer-readable format, wherein the textual content of the obtained computer-readable formatted body of text is mutable via software tools for manipulation of textual content of bodies of text;

filtering the textual content of the body of text to remove elements of the textual content, wherein the filtering act produces filtered subtext, which is a subset of the textual content of the body of text;

formatting the filtered subtext into a defined image-based format, wherein the textual content of the defined image-based formatted filtered subtext is immutable via software tools for manipulation of the textual content of bodies of text;

deriving a hash value representative of the textual content of the filtered subtext, perceptually distinct filtered subtexts having hash values that are substantially independent of each other, wherein the deriving comprises hashing the image-based formatted, filtered subtext resulting from the formatting, wherein the filtering further comprises removing superfluous elements from the textual content, thereby leaving a remaining textual content and re-arranging the remaining textual content into a canonical format.

19. A computer-readable medium embedded with computer-executable instructions that, when executed by a computer, performs the method comprising:

obtaining a body of text containing textual content in a computer-readable format, wherein the textual content of the obtained computer-readable formatted body of text is mutable via software tools for manipulation of textual content of bodies of text;

filtering the textual content of the body of text to remove elements of the textual content, wherein the filtering act produces filtered subtext, which is a subset of the textual content of the body of text;

formatting the filtered subtext into a defined image-based format, wherein the textual content of the defined image-based formatted filtered subtext is immutable via software tools for manipulation of textual content of bodies of text;

deriving a hash value representative of the filtered subtext, perceptually similar filtered subtexts having proximally similar hash values, wherein the deriving comprises hashing the image-based formatted, filtered subtext resulting from the formatting, wherein the filtering further comprises removing superfluous elements from the textual content, thereby leaving a remaining textual content and re-arranging the remaining textual content into a canonical format.

20. A computer-implemented method for hashing a body of text, the method comprising:

obtaining a body of text containing textual content in a computer-readable format, wherein the textual content of the obtained computer-readable formatted body of text is mutable via software tools for manipulation of textual content of bodies of text;

filtering the textual content of the body of text to remove elements of the textual content, wherein the filtering act produces filtered subtext, which is a subset of the textual content of the body of text;

formatting the filtered subtext into a defined image-based format, wherein the textual content of the defined image-based formatted filtered subtext is immutable via software tools for manipulation of the textual content of bodies of text;

deriving a hash value representative of the textual content of the filtered subtext, perceptually distinct filtered subtexts having hash values that are substantially independent of each other, wherein the deriving comprises hashing the image-based formatted, filtered subtext resulting from the formatting, wherein the filtering further comprises pseudo-randomly extracting elements of textual content for inclusion in the filtered subset, wherein the pseudo-random extraction is based, at least in part, upon a cryptographic key.

21. A computer-implemented method for hashing a body of text, the method comprising:

obtaining a body of text containing textual content in a computer-readable format;

filtering the textual content of the body of text to remove elements of the textual content, wherein the filtering act produces filtered subtext, which is a subset of the textual content of the body of text;

formatting the filtered subtext into a defined image-based format, wherein the textual content of the defined image-based formatted filtered subtext is immutable via software tools for manipulation of textual content of bodies of text;

deriving a hash value representative of the filtered subtext, perceptually similar filtered subtexts having proximally similar hash values, wherein the deriving comprises hashing the image-based formatted, filtered subtext resulting from the formatting, wherein the filtering further comprises pseudo-randomly extracting elements of textual content for inclusion in the filtered subset, wherein the pseudo-random extraction is based, at least in part, upon a cryptographic key.

22. A computer-readable medium embedded with computer-executable instructions that, when executed by a computer, performs the method comprising:

obtaining a body of text containing textual content in a computer-readable format, wherein the textual content of the obtained computer-readable formatted body of text is mutable via software tools for manipulation of textual content of bodies of text;

filtering the textual content of the body of text to remove elements of the textual content, wherein the filtering act produces filtered subtext, which is a subset of the textual content of the body of text;

formatting the filtered subtext into a defined image-based format, wherein the textual content of the defined image-based formatted filtered subtext is immutable via software tools for manipulation of the textual content of bodies of text;

deriving a hash value representative of the textual content of the filtered subtext, perceptually distinct filtered subtexts having hash values that are substantially independent of each other, wherein the deriving comprises hashing the image-based formatted, filtered subtext resulting from the formatting, wherein the filtering further comprises pseudo-randomly extracting elements of textual content for inclusion in the filtered subset, wherein the pseudo-random extraction is based, at least in part, upon a cryptographic key.

23. A computer-readable medium embedded with computer-executable instructions that, when executed by a computer, performs the method comprising:

obtaining a body of text containing textual content in a computer-readable format, wherein the textual content of the obtained computer-readable formatted body of text is mutable via software tools for manipulation of textual content of bodies of text;

filtering the textual content of the body of text to remove elements of the textual content, wherein the filtering act produces filtered subtext, which is a subset of the textual content of the body of text;

formatting the filtered subtext into a defined image-based format, wherein the textual content of the defined image-based formatted filtered subtext is immutable via software tools for manipulation of textual content of bodies of text;

deriving a hash value representative of the filtered subtext, perceptually similar filtered subtexts having proximally similar hash values, wherein the deriving comprises hashing the image-based formatted, filtered subtext resulting from the formatting, bodies of text, deriving a hash value representative of the filtered subtext, perceptually similar filtered subtexts having proximally similar hash values, wherein the deriving comprises hashing the image-based formatted, filtered subtext resulting from the formatting, wherein the filtering further comprises pseudo-randomly extracting elements of textual content for inclusion in the filtered subset, wherein the pseudo-random extraction is based, at least in part, upon a cryptographic key, in combination with the other limitations as claimed.

* * * * *

UNITED STATES PATENT AND TRADEMARK OFFICE
CERTIFICATE OF CORRECTION

| | | |
|---|---|---|
| PATENT NO. | : 7,356,188 B2 | Page 1 of 1 |
| APPLICATION NO. | : 09/843255 | |
| DATED | : April 8, 2008 | |
| INVENTOR(S) | : Ramarathnam Venkatesan et al. | |

It is certified that error appears in the above-identified patent and that said Letters Patent is hereby corrected as shown below:

In column 3, line 57, delete "1999;" and insert -- 1999 --.

In column 3, line 60, delete "1999;" and insert -- 1999 --.

In column 3, line 65, delete "Quantitation" and insert -- Quantization --.

In column 4, line 3, after "2001" insert -- ; --.

In column 4, line 6, delete "1999;" and insert -- 1999 --.

In column 4, line 9, delete "1999." and insert -- 1999 --.

In column 6, line 52, before "The" delete "$_{[kcc1]}$".

In column 12, line 53, before "1/c" insert -- If --.

In column 22, lines 52-57, in Claim 23, after "formatting," delete "bodies of text, deriving a hash value representative of the filtered subtext, perceptually similar filtered subtexts having proximally similar hash values, wherein the deriving comprises hashing the image-based formatted, filtered subtext resulting from the formatting,".

In column 22, lines 61-62, in Claim 23, delete "key, in combination with the other limitations as claimed." and insert -- key. --, therefor.

Signed and Sealed this
First Day of March, 2011

David J. Kappos
*Director of the United States Patent and Trademark Office*